Figure 1:
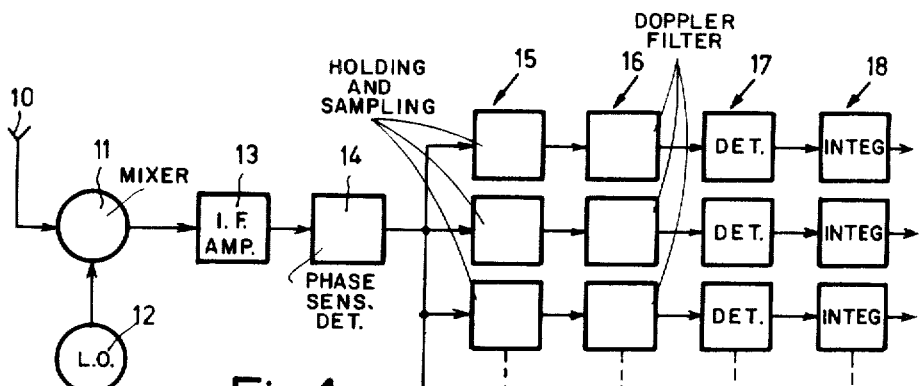

United States Patent [19]
Bergkvist

[11] 3,829,858
[45] Aug. 13, 1974

[54] ARRANGEMENT IN A RADAR EQUIPMENT FOR INDICATING A VARIABLE THRESHOLD LEVEL ON THE INDICATOR

[75] Inventor: Bengt Bergkvist, Jarfalla, Sweden

[73] Assignee: U.S. Philips Corporation, New York, N.Y.

[22] Filed: Feb. 15, 1973

[21] Appl. No.: 332,733

[30] Foreign Application Priority Data
Feb. 28, 1972 Sweden.............................. 2434/72

[52] U.S. Cl. .............................. 343/7 A, 343/5 EM
[51] Int. Cl. ............................ G01s 9/02, G01s 7/06
[58] Field of Search ......................... 343/5 EM, 7 A

[56] References Cited
UNITED STATES PATENTS
3,171,124   2/1965   Dilks et al.................... 343/5 EM X
3,249,934   5/1966   Hague............................ 343/7 A X
3,587,097   6/1971   Stull................................... 343/7 A

*Primary Examiner*—T. H. Tubbesing
*Attorney, Agent, or Firm*—Frank R. Trifari

[57] ABSTRACT

A radar equipment comprising a receiver in which incoming echo pulses are compared with a threshold level, which is variable and in each interval adjusted to a value based upon a measurement of the noise or disturbance energy, only such echo pulses being passed to an indicator which have an amplitude exceeding the threshold level. According to the invention the value of the threshold level, set in each moment, is indicated on the indicator, whereby the uncertainty as regards the sensitivity of the radar equipment caused by the variable threshold level is eliminated.

1 Claim, 4 Drawing Figures

ARRANGEMENT IN A RADAR EQUIPMENT FOR INDICATING A VARIABLE THRESHOLD LEVEL ON THE INDICATOR

The invention relates to an arrangement in a radar equipment comprising a transmitter part for transmitting radar pulses and a receiver part for raceiving energy reflected from targets in the direction of the transmitted pulses, which receiver part comprises means for determining the disturbance or noise energy, and a threshold device in which incoming echo pulses are discriminated so that only pulses exceeding a certain threshold level are indicated on an indicator, the said threshold level being variable and in each moment set on basis of the measured disturbance or noise energy.

The threshold level can be adjusted in dependence upon measurements made in special time spaces following after the echo interval or alternatively on basis of determination of the mean value of received energy in time spaces coinciding with at least a part of the echo interval. This method automatically adjust the threshold value in dependence upon measured disturbance energy has the advantage that the threshold level is automatically matched to the prevailing conditions so that the threshold value is not set too high or alternatively too low so that noise energy can reach the indicator. The method, however, has the drawback that it can give rise to a certain uncertainty as regards the reliability of the indicated target picture as it is quite possible, in case of strong disturbances, that the threshold level is adjusted to such a high value in a certain transmission direction that the equipment will be practically unsensitive and targets, if any, in this direction will not be visible on the indicator.

The invention eliminates this drawback to a great extent, which is achieved thereby that the receiver furthermore includes means whereby the threshold level prevailing in each moment is indicated on the indicator. Hereby an operator will be able to determine the sensitivity of the radar receiver in different transmission direction and if necessary in case of strong disturbances to take special steps in order to complete the target picture of the radar equipment.

According to a preferred embodiment the said means can comprise a function generator adapted to be triggered at the transmission of a radar pulse for delivering an output signal which varies with time in such manner that it represents the amplitude in the receiver of echo pulses coming from a target of given size and situated at different distances corresponding to different time positions and a comparing and pulse generating device adapted to compare the said signal with the set threshold level and to deliver a pulse to the indicator when the signal passes the threshold value.

Figure 2:
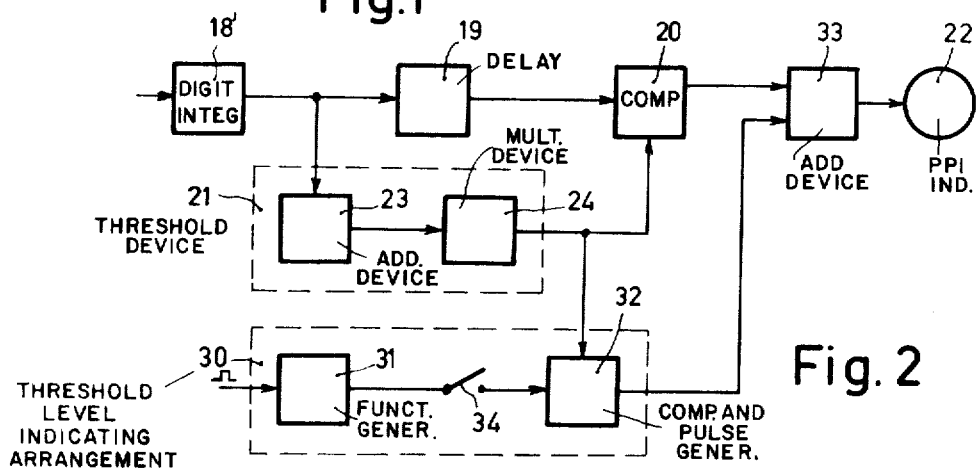
Figure 3:
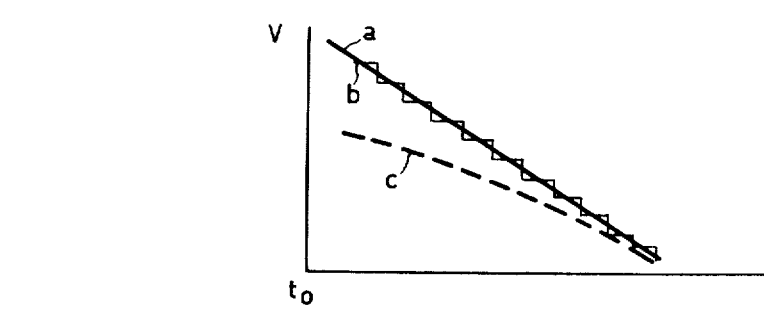
Figure 4:
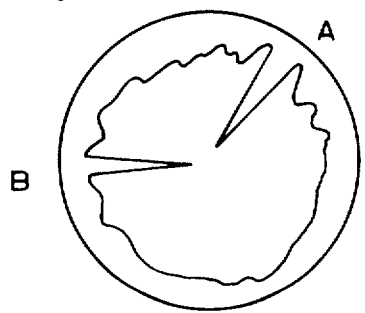

The invention is illustrated in the accompanying drawings in which FIG. 1 shows schematically the receiver part of a doppler radar equipment, in which the invention can be used, FIG. 2 shows the signal processing unit of the receiver comprising a device according to the invention, FIG. 3 shows a time diagram for explanation of the function of the device according to FIG. 2, and FIG. 4 shows an example on a pixture which can be reproduced on a PPI-screen when utilizing the device according to FIG. 2.

In the receiver part of a doppler radar equipment shown in FIG. 1 reference numeral 10 designates an antenna leading the received echo pulses to a mixer 11 in which they are combined with a local oscillator frequency from a local oscillator 12. The echo pulses are then led at intermediate frequency through an intermediate frequency amplifier 13 to a phase sensitive detector 14. From this the echo pulses are led to a sampling-holding device 15 comprising a number of sampling-holding circuits connected in parallel. The sampling-holding circuits are activated in successive order as counted from the transmission moment for a radar pulse and each "cut-out" a time space defining a distance space in the target range. The sampling-holding circuits are arranged to determine the value of the received signal during the sampling interval and maintain the value of the signal. From the samplingholding circuits the different signals in the respective time spaces are led further to a doppler filter unit 16 comprising a number of band pass filters and thereafter to a detector unit 17 comprising detectors for rectifying the signals. The rectified signals are then led to an integrator unit 18 with individual integrators in which the signals from successive sweeps are combined. The integrators are of type "forgetting integrators" so that the output signal from the respective integrator will represent the combined received signal in the respective time space during a number, for example ten, foregoing echo intervals. The signals from the integrators represent the sum of the disturbance energy from internal and external disturbance sources and desired echo pulses, if any. The output signals from the integrators are finally led to a PPI-indicator through a threshold device, to be described more closely in the following, in which disturbance and noise energy is suppressed.

FIG. 2 shows a circuit according to the invention adapted to cooperate with the receiver shown in FIG. 1, which circuit comprises on the one hand a threshod device with adjustable threshold level and on the other hand a device for indicating on the indicator the threshold value set in each moment. It is assumed that the receiver is digitalized so that an analog-to-digital converter is arranged after the phase sensitive detector 14 in FIG. 1 and the circuits following thereafter being made in digital shape. The block 18' in FIG. 2 represents a digital integrator corresponding to the integrator unit 18 in FIG. 1, which integrator 18' delivers the integrated values representing the received signal in the respective time space in series shape. These digital values appearing in series shape are then led through a delay circuit in the form of a shift register 19 to a comparing circuit 20. In this the different signal values in the respective time spaces are compared with a threshold value obtained from a threshold value determining device 21. Only such signals from the shift register 19 which exceed the threshold value are led through the comparing circuit 20 to the PPI-indicator 22.

The threshold value determination is in the shown example effected thereby that a number of successive signal values from the output of the integrator 18' are added together in a device 23 and that thereafter the obtained value is multiplied in a device 24 with a constant factor $k/N$, where N is the number of signal values which are added and k is a constant which is larger than 1. Suitably only a part of the total number of signal values during each echo interval are selected for being added in 23, suitably signal values representing the signal level in time spaces, which correspond to large distances for reflecting targets. By dividing the sum obtained in 23 with the number of added values an average value of the signal level during the selected time spaces is achieved. The set threshold value will then be $k$ times larger than this average value.

By the fact that the threshold value is varied and that this variation of the value is effected automatically in dependence upon measured noise and disturbance levels some uncertainty may arise about the sensitivity of the equipment in each moment. By the invention this uncertainty is eliminated thereby that the set threshold value is indicated on the same indicator as that where the echo pulses are reproduced, i.e., commonly a PPI-screen. The device producing this, genrally designated with 30 in the drawing, consists in the shown example of a function generator 31 and a succeeding comparing and pulse generating device 32. The function generator, which is triggered by the transmitted pulse is constructed such that it in the time interval after transmission of a radar pulse, delivers an output voltage V which represents the size of the echo pulses as measured at the output of the integrator 21, which should have been received at reflection of the radar pulses against a target of a certain given size, for example 10 $m^2$, if this target were situated at different distances from the radar equipment. If no variation of the amplification is taking place during the echo interval the amplitude of the echo reply signal should decrease with the square on the distance or the time after transmission and the generator 31 then delivers a voltage which decreases according to this time function, as is indicated by the curve $a$ in FIG. 3. If desired the voltage may be step-shaped as indicated by curve $b$ in FIG. 3 so that it is constant during each time space. If amplification regulation is utilized for the purpose of counteracting amplitude variations in the receiver with the distance to reflecting targets or the time after the transmission moment, so-called STC-regulation (STC = sensitivity time control) consideration must be taken to this regulation when determining the time course for the voltage delivered by the generator 31 so that this voltage always will represent the amplitude of the replay signal as measured at the output of the integrator. This means in case of STC-regulation that the voltage from the generator shall decrease a little steep, for example according to the curve $c$ in FIG. 3.

The voltage delivered by generator 31 is compared in the comparing and pulse generating device 32 with the threshold value set in each moment, which value is received from the device 21. When the voltage from the generator 31 decreases to a lower value than the threshold value from having been higher than the said value the device 32 delivers an artificial echo pulse which after being combined in an adding device 33 with incoming echo pulses, if any, passes to the indicator 22. Upon rotation of the antenna and synchronized rotation of the deflection direction on the PPI-screen a row of points then will be visible on the screen forming a continuous line, which represents the threshold level set in each moment. An example on such a line representing the threshold level as visible on a PPI-screen is shown in FIG. 4. The line represents the distance limit which is valid for indication of targets having the actual size, i.e., targets situated at a shorter distance than the distance represented by the said line can be discovered, while targets situated at a longer distance than the distance represented by the line will not be discovered. In the given example it has been assumed that two strong disturbing transmitters are present in the directions A and B. These disturbing transmitters have caused that the threshold level has been regulated up so high that the equipment is practically unsensitive in these directions.

In order to be able to turn-on or turn-off the threshold level indication, as desired, a switch 34 can be arranged in the connection line between the function generator 31 and the device 32 as shown in the drawing.

The described threshold level indication is not limited to be used in connection with doppler radar equipments but can be utilized in all types of radar equipments, in which discrimination of the echo reply signals is effected by means of a variable threshold value.

What is claimed is:

1. An arrangement in a radar equipment including a transmitter part for transmission of radar pulses and a receiver part for reception of energy reflected from targets in the direction of the transmitted pulses, which receiver part comprises means for determining disturbance-or noise energy and a threshold device in which incoming echo pulses are discriminated so that only pulses exceeding a certain threshold level are indicated on an indicator, the threshold level being variable and in each moment adjusted to a value based upon measured disturbance-or noise energy, a means for indicating the threshold level on the indicator comprising a function generator adapted to be triggered at the transmission of a radar pulse for delivering an output signal which varies with time in such manner that it represents the echo amplitude from a target having a certain given size in different time intervals after the transmission moment corresponding to different target distances, and a comparing and pulse generating device adapted to compare the said signal with the set threshold level and delivering a pulse to the indicator when the signal passes the threshold level.

* * * * *